Sept. 14, 1937. W. D. SCHENK 2,092,933
CRIBBING
Filed Feb. 26, 1934 2 Sheets-Sheet 1
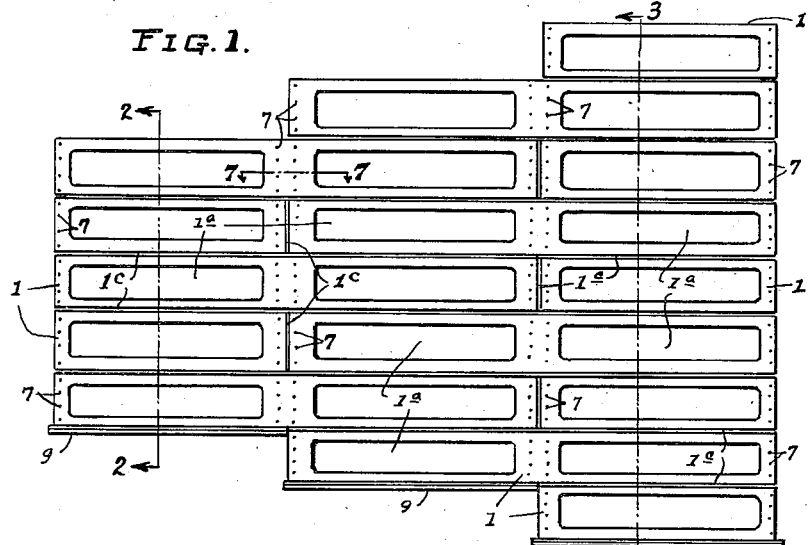
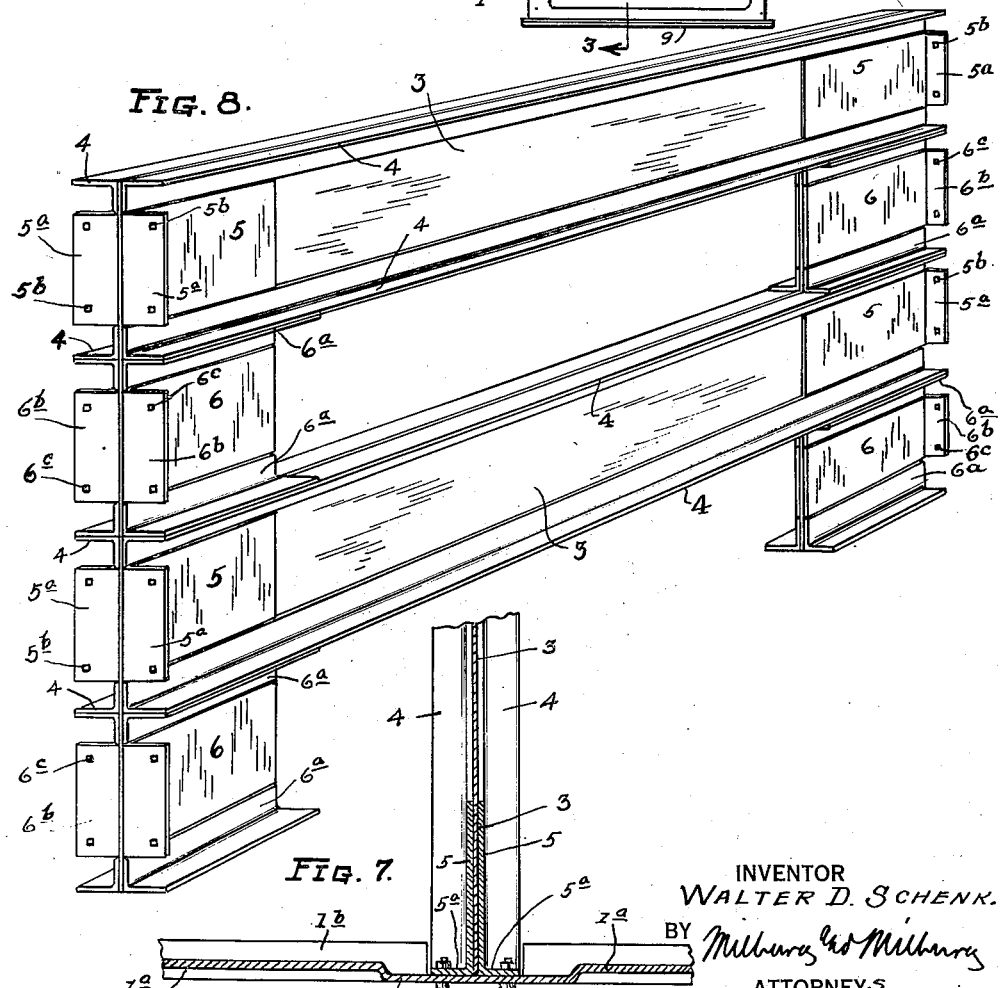
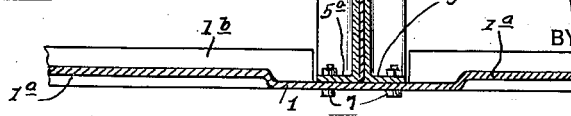
INVENTOR
WALTER D. SCHENK.
BY
ATTORNEYS.

Sept. 14, 1937.  W. D. SCHENK  2,092,933
CRIBBING
Filed Feb. 26, 1934  2 Sheets-Sheet 2
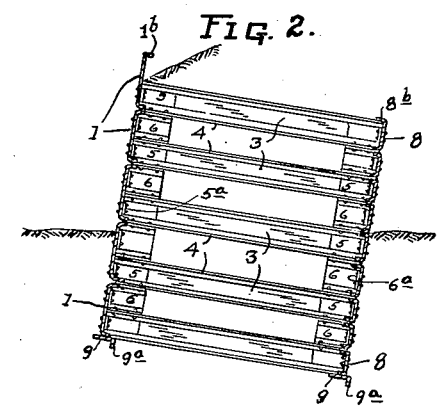
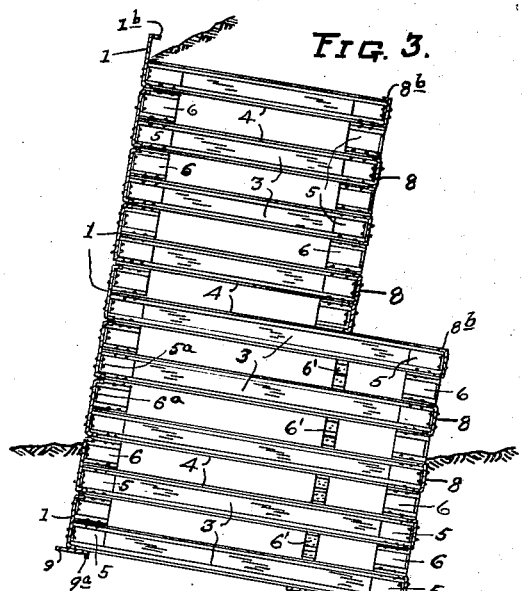
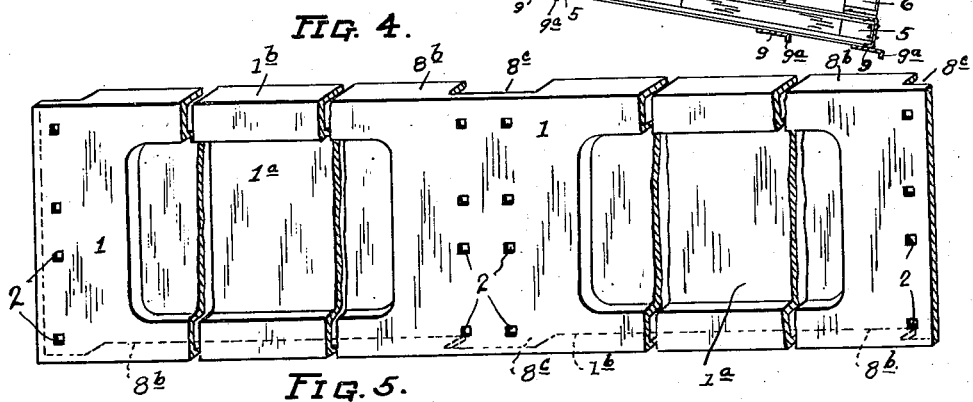
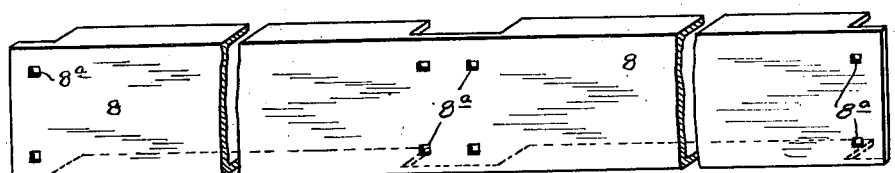
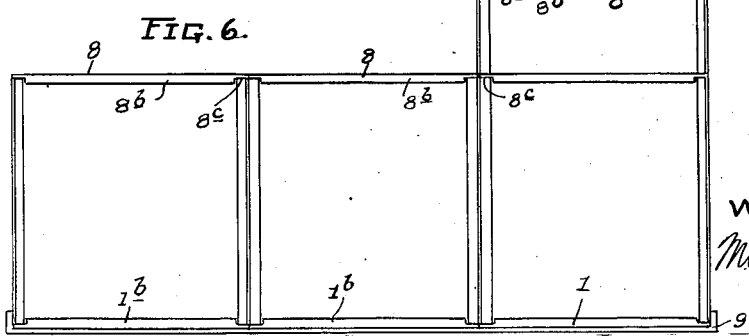
INVENTOR
WALTER D. SCHENK.
Milburn and Milburn
ATTORNEYS.

Patented Sept. 14, 1937

2,092,933

UNITED STATES PATENT OFFICE 2,092,933

CRIBBING

Walter D. Schenk, Cleveland, Ohio

Application February 26, 1934, Serial No. 712,973

10 Claims. (Cl. 61—47)

This invention relates to the art of cribbing employed for retaining walls, etc.

In the present invention, the cribbing consists entirely of metallic structure, as an improvement upon the old wooden and concrete cribbing and is an improvement also upon certain recent attempts at metal cribbing.

One object of the present invention is to devise an all metal cribbing structure in which there is comparatively little surface area exposed to the natural elements and which permits a comparatively large degree of back-fill, while at the same time there is realized a great degree of strength.

Another object is to devise such an all-metal cribbing structure in which the component elements are of comparatively light weight and small bulk for increased ease of handling and erection, without sacrificing any of the strength required for the purpose intended.

It is also an object that the fabricated metal cribbing structure possess a certain desirable degree of flexibility which is made possible by the particular form and nature of material employed in my improved combination.

A further object consists in so constructing such an all-metal cribbing that the danger of loss of back-fill is reduced to a minimum while at the same time there is permitted proper and adequate drainage.

With all of the above objects in view, it is also an object to produce a form of cribbing that is reasonable in cost as regards manufacture and assembly of the component elements as well as upkeep.

It is also an object to devise an all-metal cribbing structure that can be conveniently built up in any desired size or proportions and that can conveniently and efficiently be adapted for any given set of conditions.

The foregoing objects constitute also the objects of my companion application executed of even date, Serial No. 712,972, filed February 26, 1934.

The specific form of header members and their combination with the particular form and arrangement of stretcher members, as disclosed in this particular application, also constitute a part of the present invention.

Other objects will appear from the following description and claims when considered together with the accompanying drawings.

Fig. 1 is a front elevation of a portion of a cribbing embodying my present invention;

Figs. 2 and 3 are views taken on lines 2—2 and 3—3, respectively of Fig. 1;

Fig. 4 is a perspective view of one of the front stretcher members;

Fig. 5 is a perspective view of one of the rear stretcher members;

Fig. 6 is a plan view of a cribbing assembly embodying my invention;

Fig. 7 is a view taken on line 7—7 of Fig. 1; and

Fig. 8 is a perspective view of a plurality of headers and spacers therefor.

The front stretcher members 1 are in the form of steel panels which are depressed, as at $1^a$ and are of single or double length, as indicated in Fig. 1. These panel members are arranged end to end laterally and in vertically disposed tiers, with the end joints between adjacent stretcher members staggered, as also indicated in Fig. 1.

The front stretcher members 1 are provided with bolt holes 2 at their ends in the case of single length members, and at the ends and middle as well in the case of the double length members. In the middle of the double length members, there are provided double rows of bolt holes in vertical alignment with the two rows of bolt holes in the adjacent ends of laterally arranged stretcher members. (See Fig. 1).

It will be observed that the front stretcher members have rearwardly extending flanges $1^b$ at the top and bottom thereof, these flanges being coped out in the regions of the bolt holes, so as to accommodate attachment of the header members, as will appear.

The header members in the present case are in the form of metal plate girders 3 with metal angle members 4 welded at the top and bottom and upon opposite sides thereof so as to form an I-shaped header member.

Welded upon opposite sides of the end portions of the header members and between the angle members 4 are the angle members 5. The members 5 abut the edges of the angle members 4 and have their end flanges $5^a$ flush with the ends of the main body portion of the plate girder stretcher 3. The flanges $5^a$ in each case are substantially flush with each other and are provided with bolt holes $5^b$ for connection to the stretcher members at both the front and rear ends of the header members. The header members are constructed in the same manner at both front and rear ends thereof.

I have provided also metal spacer means between the adjacent upper and lower header members at the front and rear ends thereof. These spacer elements 6 are duplicates of the end portions of the fabricated header members and include the upper and lower angle members 6ª and the angle members having the flanges 6ᵇ which are provided with bolt holes 6ᶜ.

Thus, each end portion of each header is of three laminations and the same thing is true of the spacer elements. (See Fig. 7). The spacer elements are welded to the adjacent header members.

The header members are bolted, as at 7, to the front stretcher members and are arranged vertically above each other, there being a plurality of such vertical series, the number varying according to the size of the structure. It will be seen that the ends of the vertically arranged headers are bolted alternately to the middle of a double length stretcher member and to the ends of laterally adjacent stretcher members. That is, the header members have their ends secured across the joint between laterally adjacent stretcher members.

It is to be understood that the cribbing structure may be made of any desired size and proportions according to any given set of conditions and the shape of the front wall will therefore be determined thereby. Likewise, the single and double lengths of stretcher members may be employed whenever suitable according to the shape of the wall as determined by the conditions.

The rear ends of the header members are connected to the rear metal stretcher members 8 which are bolted thereto through the bolt holes 8ª. The members 8 are flanged at top and bottom edges, as indicated at 8ᵇ, except at the points 8ᶜ where they are coped out so as to accommodate their connection to the header members.

Metal spacer elements of the same form and construction as the front spacer elements, are inserted at the rear in the same manner as at the front, but the rear stretcher members 8 are connected only to the header members and not to the spacer elements, and are accordingly of only single width as compared with the front stretcher members.

The rear stretcher members 8 are of single and double lengths, as in the case of the front stretchers 1, and are alternated laterally across the rear of the cribbing structure, and the joints in the the vertically adjacent tiers of rear stretcher members are staggered in the same manner as in the case of the front stretcher members. This will be readily understood from the illustration of the front stretchers in Fig. 1.

As indicated in Fig. 3, some of the header members may be of greater length, and metal spacers may be inserted between the longer headers midway of the length thereof and at points in the same plane as those spacers between the rear ends of the shorter headers, as indicated by reference numeral 6'. These intermediate spacers may be duplicates of the front and rear spacers. The intermediate spacers have their top and bottom flanges welded to the flanges of the header members. In this way, the middle portions of the longer headers are reinforced against the load applied thereto by the weight of the shorter headers above. Thus, I am enabled to employ longer headers without sacrificing any of the strength which is characteristic of the cribbing structure in which shorter lengths of header members are employed.

At the bottom of my cribbing structure, I have provided the footing stretchers 9 in the form of metal strips which extend across the bottom of the structure, as indicated in Figs. 2 and 3.

These footing stretchers 9 are welded or otherwise suitably secured to the cribbing structure at the front and rear and also at a point just beneath and in the plane of the auxiliary spacers 6', in the case of longer headers being employed, as instanced in Fig. 3.

The footing stretchers each have a depending flange 9ª which is intended to engage the ground upon which the cribbing structure is built, so as to assist in maintaining the same in set position.

In case the cribbing should be set upon rock or ground of a rocky nature, then the flange 9ª may be omitted or it may be provided as an upwardly extending flange at the front edge thereof for reinforcing purposes. Such upwardly extending flange would be provided only at intervals upon the middle footing stretcher, that is, between the headers, as will be understood from Fig. 4.

My entire cribbing structure may preferably be fabricated from steel, the header and stretcher members as well as all other parts being formed preliminarily in standard sizes which may be kept in stock. Also, the headers are to be recognized as self-contained units which may be handled and applied as such.

This structure is of comparatively light weight and accordingly involves a comparatively small quantity of structural material, which means greater convenience in shipping and handling and assembling the several units and also a comparatively low cost of materials, shipping and labor.

At the same time, because of the particular structure and arrangement of the girder form of headers, together with the stretchers, the entire combination is capable of withstanding the stresses to which subjected by the load of material which fills the same. Not only does the girder form of header prove most efficient in supporting the load but the entire structure possesses a certain degree of flexibility by virtue of the particular form of header and stretcher members.

Also, the girder form of headers permits the earth and other such material to be filled in between the headers, which means a more compact mass approaching the condition of a self-supporting load, since the load upon the top of any given header is comparatively little because of the correspondingly small extent of top surface of each header member. At the same time, the back-fill of earth, etc., is permitted to entirely fill the space between the headers and thus surround each and every header member with practically no void.

Thus, the header members may be regarded as constituting virtually a means of embedded metallic reinforcement for the practically solid body of back-fill, which is the ideal condition for a cribbing or retaining wall structure.

Furthermore, I have devised a convenient and efficient means of connecting the header members to each other and also for connecting the front and rear stretcher members to the header members and front spacer members.

Also, the practically continuous front wall afforded by the structure and arrangement of the front stretcher members, prevents the back-fill from being washed away through the cribbing. At the same time, I have allowed sufficient space 1ᶜ between the stretchers to permit passage of water therethrough without carrying away any of the back-fill.

The practically continuous front wall also lends to the appearance of the structure which can be still further improved by application of aluminum paint or the like thereto. Such a coating would also serve as a protecting medium against the natural elements.

What I claim is:

1. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for securing said members together.

2. A cribbing structure comprising stretcher and header members, said header members being in the form of metal I-beams arranged on edge and having laterally extending flanges at the top and bottom edges thereof, spacer members of substantially the same form as said header members and arranged between the end portions of the same with their top and bottom flanges engaging the flanges of said header members, and means for securing said members together.

3. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for securing said members together, said means including plates attached to the end portions of said header members and to said spacer members for securing said stretcher members thereto.

4. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for securing said members together, said means including substantially duplicate L-members attached to the sides of the end portions of said header members and of said spacer members for securing said stretcher members thereto.

5. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for securing said members together, said means including substantially duplicate L-members attached to the opposite sides of the end portions of said header members and of said spacer members, thereby forming substantially T-shaped ends upon said header and spacer members for attachment of the stretcher members.

6. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for attaching front stretcher members to said header and spacer members and for attaching rear stretcher members only to said header members.

7. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for attaching front stretcher members to said header and spacer members with the joints between the laterally adjacent stretcher members staggered vertically.

8. A cribbing structure comprising stretcher and header members, said header members being in the form of metal beams arranged on edge and having laterally extending flanges at the top and bottom edges thereof, spacer members of substantially the same form as said header members and arranged between the end portions of the same with their top and bottom flanges engaging the flanges of said header members, and means for securing said members together, said stretcher members at the front being in the form of metal plates substantially closing the entire front of the structure, and said stretcher members at the rear being in the form of metal plates secured only to the header members and closing only a part of the rear of the structure.

9. A cribbing structure comprising stretcher and header members, said header members being in the form of metal beams arranged on edge and having laterally extending flanges at the top and bottom edges theerof, spacer members of substantially the same form as said header members and arranged between only the end portions of the same with their top and bottom flanges engaging the flanges of said header members, and means for securing said members together.

10. A cribbing structure comprising stretcher and header members, said header members being in the form of metal beams arranged on edge and having laterally extending flanges at the top and bottom edges thereof, spacer members of substantially the same form as said header members and arranged between only the end portions of the same with their top and bottom flanges engaging the flanges of said header members, and means for attaching front stretcher members to said header and spacer members and for attaching rear stretcher members only to said header members.

WALTER D. SCHENK.